Figure 1:
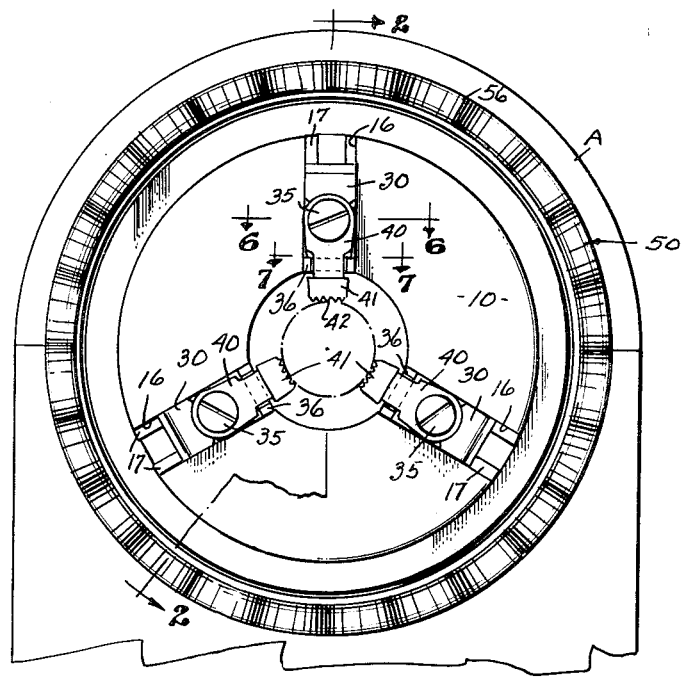

Oct. 5, 1954    R. B. PEALER    2,690,915
JAW CHUCK
Filed March 12, 1951    3 Sheets-Sheet 1

INVENTOR.
ROBERT B. PEALER
BY Bates, Teare, v McBean
ATTORNEYS

Oct. 5, 1954   R. B. PEALER   2,690,915
JAW CHUCK

Filed March 12, 1951   3 Sheets-Sheet 2

INVENTOR.
ROBERT D. PEALER
BY
Bates, Teare & McDean
ATTORNEYS

Oct. 5, 1954  R. B. PEALER  2,690,915
JAW CHUCK
Filed March 12, 1951  3 Sheets-Sheet 3
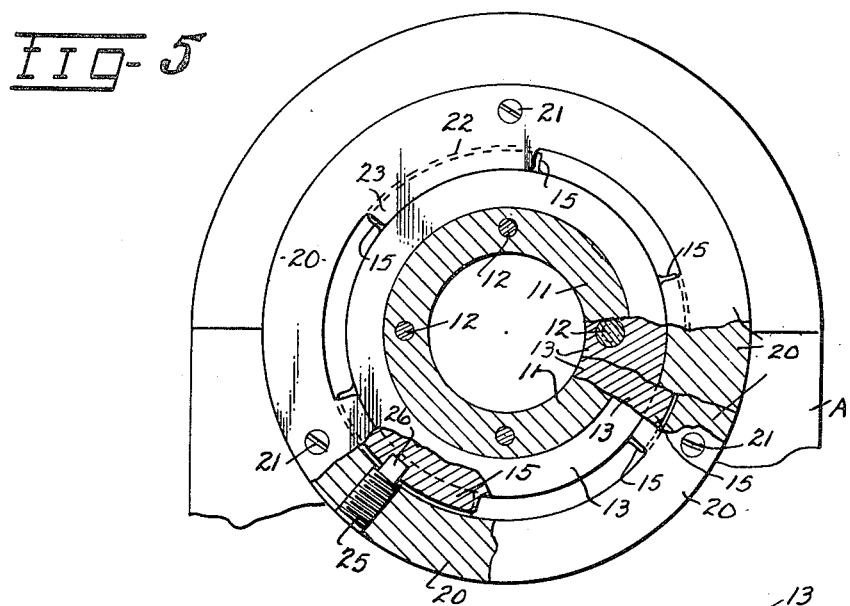
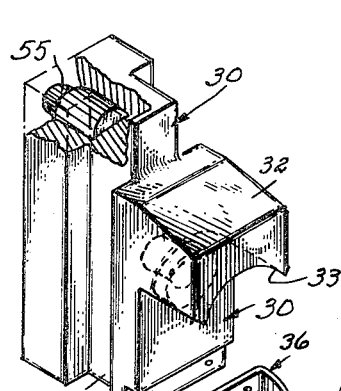
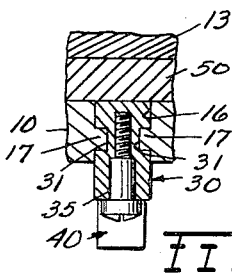
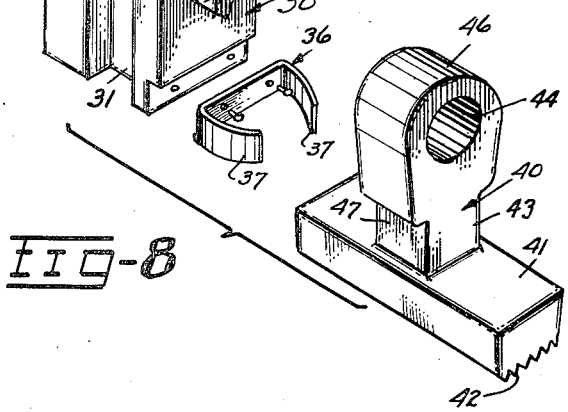
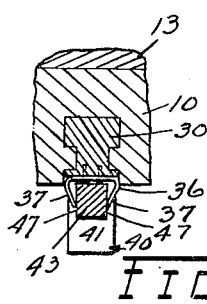
INVENTOR.
ROBERT B. PEALER
BY
Bates, Teare, v McBean
ATTORNEYS Patented Oct. 5, 1954

2,690,915

UNITED STATES PATENT OFFICE 2,690,915

JAW CHUCK

Robert B. Pealer, Garrettsville, Ohio, assignor to Beaver Pipe Tools, Inc., Warren, Ohio, a corporation of Ohio Application March 12, 1951, Serial No. 215,134

4 Claims. (Cl. 279—114)

1

This invention relates to a chuck having a plurality of jaws spaced about the axis for gripping the article to be rotated, and is of the type having a chuck frame, a radially-placed equi-distant jaws movably carried thereby, and a scroll plate, the turning of which may force the jaws inwardly or outwardly. The invention is concerned with the formation and operation of the jaws and the means for carrying them, to enable the jaws to obtain a very effective grip on the article. It is also concerned with the means for turning the scroll plate which comprises a hand wheel mounted coaxial with the scroll plate and operating it. These features, as well as various novel details of construction, are hereinafter more fully explained in connection with the illustrative embodiment shown in the drawings.

Figure 2:
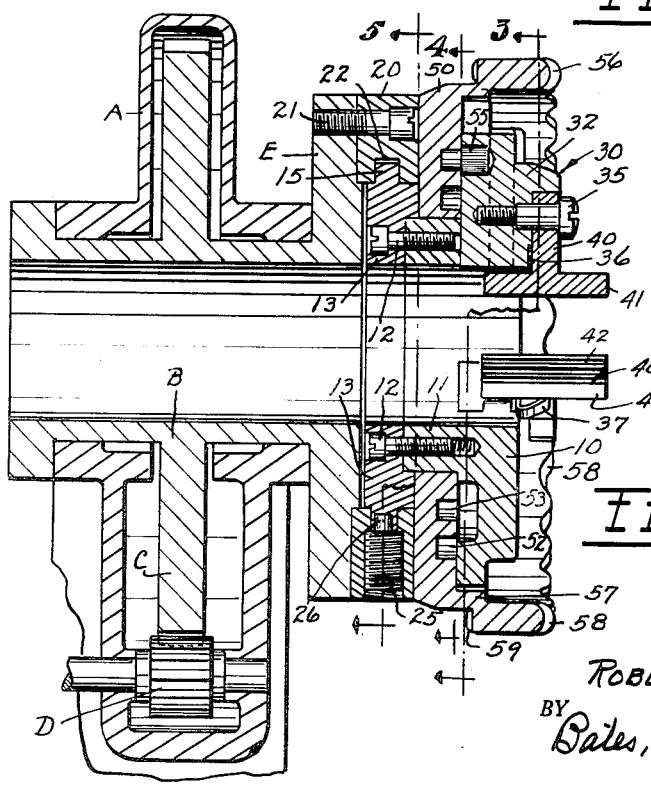
Figure 3:
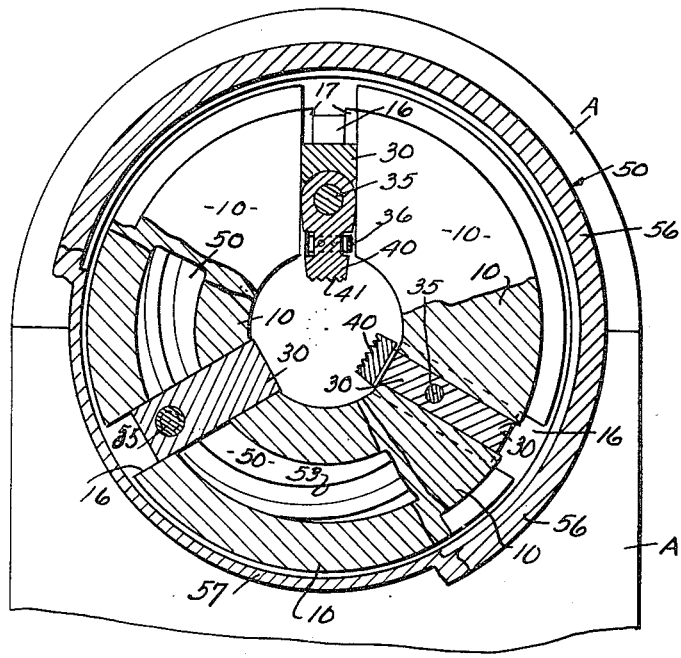
Figure 4:
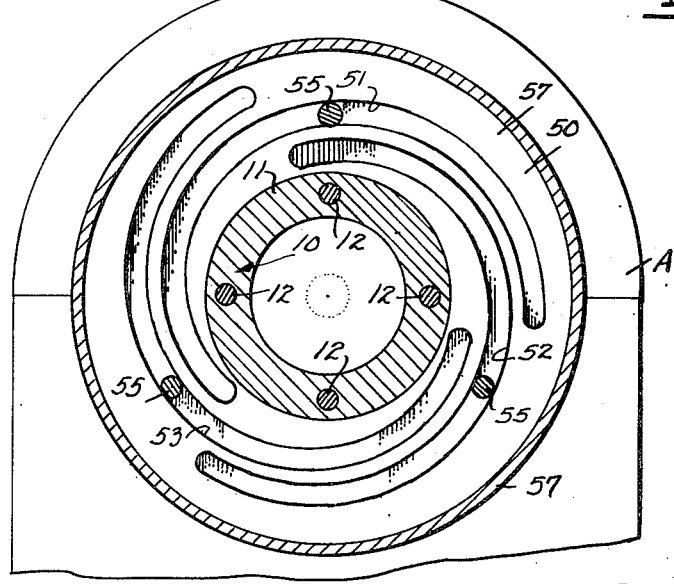

In the drawings, Fig. 1 is an end view of a chuck embodying my invention; Fig. 2 is an axial section thereof, as indicated for instance by the line 2—2 on Fig. 1; Figs. 3, 4 and 5 are vertical sections parallel with Fig. 1 and in planes indicated approximately by the correspondingly numbered lines on Fig. 2; Figs. 6 and 7 are transverse sections through any of the jaws, as indicated for instance by the correspondingly numbered lines on Fig. 1; Fig. 8 is an exploded view of any one of the jaws and the carrier therefor, this view being on a larger scale than any of the preceding figures.

In Fig. 1, A indicates any suitable frame housing in which is journaled a driving barrel B. This barrel is shown as carrying a spur gear C meshing with a driving pinion D. The barrel has a substantially flat annular head E on which my chuck, about to be described, is mounted.

What may be called the frame of the chuck consists of an annular plate 10, so mounted in use on the barrel head E as to be rotated therewith. I have shown the chuck frame 10 as comprising a disc portion having a reduced annular integral portion 11 at the rear face thereof, the bores of the two portions aligning. The portion 11 is rigidly attached by screws 12 to a ring 13. This ring is formed to have a breech-lock connection with a ring 20 attached to the barrel head E, as by screws 21. The clutch ring 13 has a plurality of arcuately spaced ribs 15 on its exterior, and the ring 20 has a groove 22 on its inner periphery with openings in the side toward the chuck frame, such openings having an arcuate length at least as great as that of the ribs 15.

Accordingly, the chuck with its carrying ring 13 may be shoved axially toward the driving barrel until the arcuate ribs 15 are within the groove 22, whereupon a partial rotation of the chuck brings the ribs behind the walls of the groove. The chuck is then locked in this position by a radial set screw 25 mounted in the carrying ring 20 and having a pilot end 26 adapted to enter a recess in the chuck ring 13.

The provision above described enables the chuck to be readily mounted as a unit on the head of a suitable driving chuck barrel. However, if desired, other means than those shown may be provided for attaching the chuck frame to the driving barrel.

The disc portion of the chuck frame 10 of the chuck has a series of radial grooves 16 extending from its bore to its outer periphery. There are preferably three of these grooves arranged equidistantly about the axis. Each groove is provided with ribs 17 (Fig. 6) on its opposite sides. This provides an under-cut passageway in which is mounted a radially slidable jaw-carrier 30, having corresponding grooves 31 on its opposite sides. Each jaw-carrier carries a jaw 40 pivotally connected to the carrier and having a slight swinging movement with reference thereto.

Each jaw 40 is of the T-form shown in Figs. 2 and 8 and has an extended head 41 with teeth 42 on its inner face, and has a central shank 43 provided with an opening 44 for the passage of a pivot pin 35 pivoting the jaw to the jaw carrier. The pivot pins 35 extend parallel with the chuck axis, so that jaws are adapted to swing in a plane normal to such axis.

The jaw carrier has rigid portion 32 projecting over the end of the jaw shank and provided on its under-face with a concavity 33 against which the convex outer end 46 of the jaw bears. This takes the thrust from the jaw directly to the jaw carrier independently of the pivot pin.

The jaw is centralized on the jaw carrier, and the amount of swing of the jaw relative to the jaw carrier is limited, by a U-shaped spring 36 fastened by screws to the jaw carrier and having converging spring arms 37 bearing against reduced faces 47 on the jaw.

The peculiar mounting of the jaws on the jaw carriers enables the jaws to be brought by their carriers into snug engagement with the article to be rotated, after which the rotation of the chuck results in a slight swinging of the jaws which gives a tighter binding action on the article.

To operate the jaw carriers with their jaws, I provide a scroll plate 50. This plate is rotatably mounted on the reduced annular extension 11 of the frame plate and thus stands between the jaw carriers and the breech-lock members of the chuck and its driving device. This scroll plate 50 is provided with three spiral scrolls 51, 52, and 53, Fig. 4, each of which receives a pin 55 rigidly mounted in the corresponding jaw carrier. The result is that the partial rotation of the scroll plate with reference to the frame shifts the jaws radially in or out, as the case may be.

To operate the scroll plate without a wrench, I prefer to provide a hand wheel 56 secured to the scroll plate. This hand wheel consists preferably of an annular rim, rigidly attached to the scroll plate adjacent its outer edge, and extending axially away from the scroll plate and toward the free end of the chuck, so that it surrounds the jaw carriers, as shown in Fig. 2. This hand wheel is shown as integral with the scroll plate, being connected with it by the annular flange 57, and is preferably provided with scalloped edges 58 and 59 to enable it to be conveniently grasped by the operator.

In the operation of my chuck, for instance, in clamping a pipe projecting through the driving barrel B, I simply turn the hand wheel manually in the direction to cause the scroll plate to feed the jaws inward radially until they are snugly in engagement with the pipe; then as the driving barrel begins to rotate the action is to cause the jaws to swing slightly to increase their clamping engagement with the pipe.

It will be seen that I do not resort to a blow by the hand wheel to set the jaws, as the normal turning of the scroll plate by the rigidly attached hand wheel will bring the jaws snugly into engagement of the pipe, and then as the rotation starts the swinging of the jaws completes the binding action to obtain a very firm gripping of the pipe.

As shown in Figs. 1 and 8 the shanks on the jaws extend from the mid-region of the jaws, thus equalizing the thrust from the jaw to the jaw carrier, and the overhanging wall on the carrier transfers this thrust directly to the carrier without relying on the pivoted pin itself. The jaw carrier thrust is transmitted by the carrier pins directly to the scroll plate. By having scroll grooves of considerable width, as shown, the carrier pins may be large enough to transmit the thrust to the scroll plate effectively and without undue wear.

It will be understood from the description given, that my chuck is very readily operable without a wrench or other extraneous tool, and that when the jaws are once set by the hand wheel, the rotation automatically seats them with gripping firmness on the pipe. My chuck is of comparatively simple construction for the movements effected, and may be readily mounted on existing driving chuck barrels.

I claim:

1. In a chuck having an annular body adapted to be rotated and provided with a plurality of radially extending guideways each having a pair of side walls, a jaw carrier movably mounted in each guideway, a manually operable scroll carried by the body and interconnected with the carriers to reciprocate the carriers in their guideways, the combination of a forwardly facing socket extending inwardly into each carrier, a jaw seated in each socket and having a gripping surface to engage a work piece, each of said sockets having an inner wall extending in a plane normal to the axis of rotation of the body, each of said jaws having a surface coacting with the respective socket surface to prevent inward movement of the jaw, a pivotal connection between the jaw and the body to permit swinging of the jaw about an axis parallel with but offset from the axis of rotation, resilient means to bias the jaw to a radial position relative to such axis, and wherein the side walls of each guideway extend outward beyond its carrier to engage the jaw and limit the swinging movement thereof.

2. In a chuck of the type having an annular body adapted to be rotated about its axis and provided at one end with a plurality of radially extending grooves each of which has a pair of side walls, a jaw holder mounted for radial reciprocation in each groove, a manually operable scroll carried by the body and interconnected with the holders to reciprocate the jaw holders consequent upon operation of the scroll, a jaw removably mounted on each jaw holder, wherein each jaw comprises an inverted T-shaped member having a work engaging surface on its bottom face and a central upstanding shank having a pivot pin opening and a convex arcuate upper surface, the opening and arcuate surface having a common axis which extends parallel with the axis of rotation of the body, said shank having a substantially flat inwardly facing inner wall, each holder having a substantially flat outward facing wall to coact with the inner wall of the shank, a pivot pin carried by each holder, each pin passing through the opening in its respective shank and being provided with a head to retain the respective jaw seated against the holder wall, each holder having a rigid portion projecting outwardly over the upper end of its respective jaw shank and provided on its under surface with a concavity to coact with the convex upper surface of the jaw and thereby transmit the upper thrust of the jaw directly to the holder independent of the pivot pin, and a U-shaped spring having its base secured to the holder and its legs projecting outward and embracing the sides of the jaw to bias the jaw to a radial position relative to the axis of rotation, and wherein said holder face is inset into the groove and the shank width is less than the width of the groove whereby the side walls of the grooves limit the swinging movements of the jaw.

3. In a chuck of the type having a barrel adapted to be secured to a face plate to rotate the chuck about the axis of the chuck and plate, said barrel having a plurality of radially movable work gripping jaws and a manually operable scroll rotatably mounted on the barrel to actuate the jaws, and a ring to retain the scroll in position on the barrel, securing means to secure said ring to the inner face of the barrel, said ring having an external diameter less than the external diameter of the chuck, a second ring having a central opening to receive the first-named ring, means to secure said last-named ring to the outer face of said plate, and a separable breech lock connection between the two rings whereby the barrel, the scroll plate, the jaws and the first-named ring may be removed from the plate as a unit without disturbing either of said securing means, and a manually releasable means independent of said securing means to prevent separation of the breech lock members.

4. In a chuck of the type having a barrel adapted to be secured to a face plate to rotate the chuck and having a plurality of radially movable work gripping jaws and a manually operable scroll rotatably mounted on the barrel to actuate the jaws, the combination of a ring to retain the scroll in position on the barrel, securing means to secure said ring to the barrel adjacent its inner face, a second ring having a central opening to receive the first-named ring, means to secure said last-named ring to the outer face of said plate, said second-named ring having an external diameter less than that of the chuck, and a separable breech lock connection between the two rings whereby the barrel, the scroll plate, the jaws and first-named ring may be removed from the plate as a unit without disturbing either securing means, said connection comprising an annular recess on one of the rings, a plurality of spaced radially extending tongues on the other of said rings and arranged to rotate in said recess, the outer wall of the recess being cut away to permit the passage of the tongues of the other ring consequent upon relative axial movement between the two rings whereby a following relative partial rotation between the rings will prevent further axial movement, and a manually releasable means to retain the rings in their rotated position.

References Cited in the file of this patent

UNITED STATES PATENTS

| Number | Name | Date |
|---|---|---|
| 917,387 | Webb et al. | Apr. 6, 1909 |
| 1,274,685 | Cline | Aug. 6, 1918 |
| 1,794,511 | Bush | Mar. 3, 1931 |
| 1,799,019 | Mischler | Mar. 31, 1931 |
| 1,844,616 | Whiton | Feb. 9, 1932 |
| 2,429,524 | Oetzel | Oct. 21, 1947 |
| 2,523,374 | Jensen | Sept. 26, 1950 |
| 2,591,389 | Wallace | Apr. 1, 1952 |